United States Patent [19]
Walker

[11] Patent Number: 5,185,765
[45] Date of Patent: * Feb. 9, 1993

[54] HIGH SPEED DATA COMMUNICATION SYSTEM USING PHASE SHIFT KEY CODING

[76] Inventor: Harold R. Walker, 78 Oliver Ave., Edison, N.J. 08817

[*] Notice: The portion of the term of this patent subsequent to May 3, 2005 has been disclaimed.

[21] Appl. No.: 557,322

[22] Filed: Jul. 23, 1990

Related U.S. Application Data

[63] Continuation-in-part of Ser. No. 237,655, Aug. 29, 1988, abandoned, which is a continuation-in-part of Ser. No. 188,211, Apr. 29, 1988, abandoned, which is a continuation-in-part of Ser. No. 861,049, May 8, 1986, Pat. No. 4,742,532.

[51] Int. Cl.$^5$ .......................................... H04L 25/49
[52] U.S. Cl. ...................... 375/22; 332/109; 329/312; 375/37; 375/122; 379/97
[58] Field of Search ............. 360/40, 44; 332/106, 332/109, 110, 111; 375/22, 25, 27, 37, 59, 121, 122, 7, 8; 455/45; 341/52, 53; 370/69.1; 379/90, 97

[56] References Cited

U.S. PATENT DOCUMENTS

| | | | |
|---|---|---|---|
| 3,980,954 | 9/1976 | Whyte | 455/45 |
| 4,021,853 | 5/1977 | Murphy | 360/44 |
| 4,540,957 | 9/1985 | Hanna | 332/109 |
| 4,742,532 | 5/1988 | Walker | 375/50 |
| 4,866,737 | 9/1989 | Seifried | 375/22 |

Primary Examiner—Benedict V. Safourek
Attorney, Agent, or Firm—Arthur L. Plevy

[57] ABSTRACT

An improved binary data communication system employs an improved VPSK encoding procedure wherein each input data bit has a bit period of M clock periods, and the data bit polarity changes are phase shift key coded with waveform widths of M/M, M+1/M, and M+2/M bit periods wherein M is an even integer greater than 3. Each of the data bits (except the last one in an encoding cycle) is encoded in an encoding signal which switches back and forth between "1" and "0" polarities and has assigned widths representing whether or not the polarity of the data bit is changed from that of the previous data bit, and whether it is the last (M-1th) polarity change in the encoding cycle. At the receiving end, a complementary procedure is used to decode the encoded signal. For transmission, the encoded signal is filtered for higher order harmonics and integrated in order to provide a sine wave output shifted 90 degrees in phase. Upon reception, the received signal is differentiated and a zero crossover detector is used to regenerate the encoded signal for decoding. The improved encoding technique can achieve Nyquist efficiencies of 10, 12.6, and 15.3 bits/Hz-bandwidth, or higher, for M equal to 6, 8, and 10 modulation levels, respectively. The encoded signal spectrum fits typically within about 1/6 of the bandwidth of the baseband NRZ signal. The encoded signal is particularly useful for transmission at high data rates in telephone, RF modulated carriers, and other transmission systems.

22 Claims, 11 Drawing Sheets

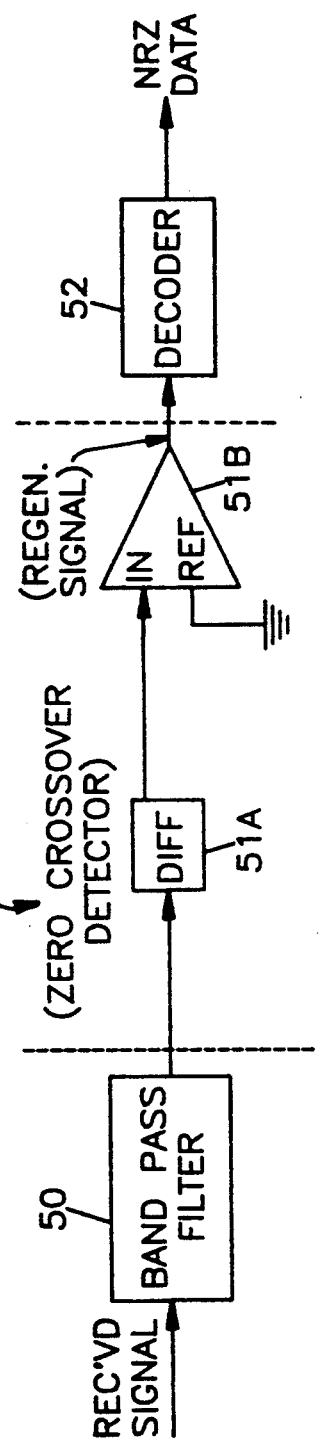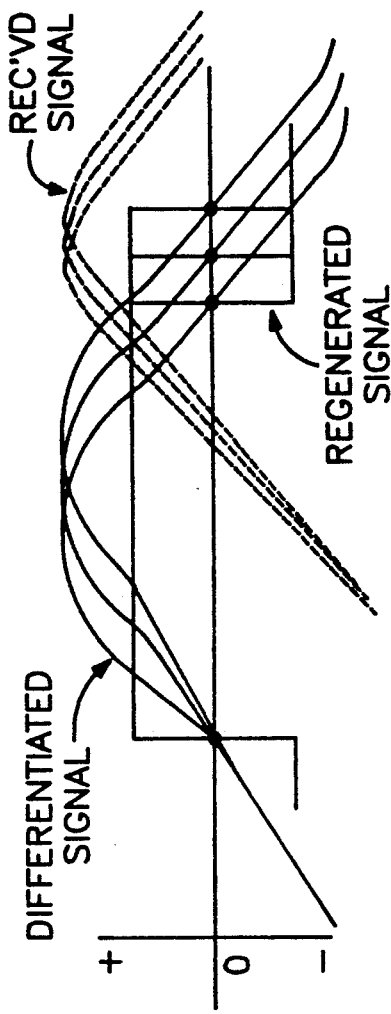

HIGH SPEED DATA COMMUNICATION SYSTEM USING PHASE SHIFT KEY CODING

This application is a continuation-in-part of U.S. patent application Ser. No. 07/237,655, filed on Aug. 29, 1988, entitled "High Speed Data Communication System", now abandoned, which was a continuation-in-part of application Ser. No. 07/188,211, filed on Apr. 29, 1988, now abandoned, which in turn was a continuation of application Ser. No. 06/861,049, filed on May 8, 1986, entitled "High Speed Binary Data Communication System", which issued as U.S. Pat. No. 4,742,532 on May 3, 1988, all by the same inventor, Harold R. Walker. The prior disclosures are incorporated herein by reference.

FIELD OF INVENTION

The present invention relates to data communication systems, and particularly, to a communication system which uses an improved form of phase shift key coding of binary data in order to obtain high data compression in a given bandwidth without loss of signal-to-noise ratio.

BACKGROUND OF INVENTION

Many techniques for compressing data bandwidth in communication systems are known to those skilled in the art. A comprehensive survey of such techniques is given in "Principles of Communication Systems", by Herbert Taub and Donald L. Schilling, published by McGraw-Hill Publishing Co. Two of the best known methods are Quadrature Amplitude Modulation (QAM) and Multiple Phase Shift Keying (MPSK). In the QAM method, a binary input signal is used to modulate the amplitude envelope of a carrier signal while a second digital signal modulates the R.F. signal in phase and in quadrature to the FM signal. Zero crossings between the peaks and dips of the amplitude envelope are detected on the receiving end as bit changes along with measurements of amplitude in order to restore the binary data. However, this method is subject to considerable error in restoring the data if undesired amplitude and phase shifts are detected as bit changes. In the MPSK method, e.g., bit changes in the input data signal are encoded in reformatted pulses according to fixed encoding rules and the R.F. signal is phase modulated by fixed angular phase changes.

Certain pulse width modulated schemes have been used at baseband to modify the spectrum for easier data processing. For example, in the encoding technique which is referred to as MFM or Miller Encoding, output pulses are encoded with widths of 2, 3, and 4 times the clock period (1, 1.5, and 2 times the bit width) with their phases delayed to the end or center of a data bit for "0" or "1", respectively. By suitable filtering, only those frequencies resulting from the defined set of periods need to be detected to restore the original data signal. Unfortunately MFM does not conserve bandwidth when used to modulate an R.F. carrier.

A QAM modulation system affords a transmission improvement of 2 or more times over baseband NRZ or a single sideband carrier system, while it gives an improvement of 4 or more times over the typical AM modulated carrier system. Both of these methods are theoretically capable of bandwidth compression up to a limit of about 10 to 1. However, such compression would be achieved with a considerable loss in signal-to-noise ratio. In order to reduce errors due to signal-to-noise ratio, a 10-to-1 compression ratio typically requires a 100-to-1 increase in power. This is due to the well-known relationship applicable to both the QAM and MPSK methods, i.e., $2^N = M$, where N represents compression efficiency (referred to as the Nyquist Factor) expressed as the number of bits per hertz of bandwidth, and M represents the number of modulation levels. For example, a Nyquist Factor of $N=10$ would require 1024 modulation levels in the above-described conventional methods. The high number of modulation levels would greatly increase the power requirement or seriously degrade the signal-to-noise ratio, and therefore such an increase in Nyquist Factor is barely attainable by the conventional methods.

In the related U.S. Pat. No. 4,742,532 of Harold R. Walker, a new method of modulation is disclosed which is referred to as Variable Phase Shift Keying (VPSK). In the VPSK modulation scheme described in the Walker patent, changes of state between "1" and "0" of a binary NRZ (non-return to zero) input data signal are encoded to pulse signals having varying time periods which are 4/4, 5/4, and 6/4 times the bit period according to a particular set of coding rules. It would appear that this is a variation of MFM as used in double density disk recording but the spectral content of a 2, 3, 4 MFM pattern and the spectral content of a VPSK signal are entirely different. For reasons not easily explained MFM with $M=2$ does not compress the bandwidth, while increasing the M number to 3 or greater results in compression.

As illustrated in FIG. 1 herein, an NRZ input signal consists of a string of "1" and "0" bits of a given period. An encoder outputs a rectangular wave signal which switches polarity with varying widths depending upon the data bits encountered in the input stream. The encoded signal is given a width of 4/4 bit period when no change of the polarity state from one data bit to the next is detected (bit which is "1" or "0" is repeated), or a width of 5/4 bit periods when a data bit polarity change is detected. The last data bit polarity change is encoded in one of two widths, depending upon the state of the following, last data bit in the encoding sequence. The last data bit in the encoding sequence is then omitted to make up for the longer widths of the encoded signal. A width of 6/4 bit periods is used when the last data bit is a "1" after four data bit polarity changes. When the last bit is a "0" after four data bit polarity changes, no change is made to the encoding period. The "1" or "0" bit will automatically be restored by the decoder program. This method can obtain a Nyquist Factor of 7.2 bits/Hz-bandwidth using 4 modulation levels. Thus, it surpasses the conventional compression efficiency relationship, wherein 4 modulation levels would provide a Nyquist Factor of 2 ($2^2=4$).

However, it is desirable to increase the compression efficiency in data communication systems even further, for example, to a Nyquist Factor of 10 bits/Hz-bandwidth or higher. In the conventional QAM and MPSK systems, increasing the number of modulation levels above 4 requires approximately 6 dB or 4 times the power level for each increase of 2 in the Nyquist Factor, otherwise a serious loss in signal-to-noise ratio is encountered. It is therefore a principal object of the invention to provide an improved binary data communication system which produces a large improvement in the Nyquist Factor over the prior methods without a corresponding increase in the power requirement or loss of signal-to-noise ratio.

SUMMARY OF INVENTION

In order to increase compression efficiency in a data communication system without loss in signal-to-noise ratio and without requiring large increases in power or modulation levels, an improved binary data encoding procedure and transmission system is provided in the invention. In the improved encoding procedure, each input data bit has a bit period of M clock periods, and the data bit polarity changes are phase shift key coded with waveform widths of M/M, M+1/M, and M+2/M bit periods wherein M is an even integer greater than 3. Each of the data bits (except the last one in an encoding cycle) is encoded in an encoding signal which switches back and forth between "1" and "0" polarities with a width dependent on whether or not the polarity of the data bit is changed from that of the previous data bit. A counter is set to count M-1 data bit polarity changes in each encoding cycle. When the present data bit is the same as the previous data bit (no polarity change), the encoding signal is switched to the opposite polarity with a width of M/M bit period after the previous change in polarity. When the present data bit is changed from that of the previous data bit, the polarity of the encoded signal is switched with a width of M+1/M bit periods after the previous polarity change. Upon the M-1th data bit polarity change, the encoded signal is given a width of M+2/M bit periods, and the counter is reset for the next encoding cycle. At the receiving end, a complementary procedure is used to decode the encoded signal.

For transmission, the rectangular wave encoded signal is filtered for higher order harmonics and integrated in order to provide a sine wave output shifted 90 degrees in phase from the encoded signal. Upon reception, the received signal is differentiated to shift its phase back 90 degrees, and a zero crossover detector is used to regenerate the encoded signal for decoding. A special bandpass filter arrangement is used to compensate for phase distortions introduced in transmission. In phase modulation circuits the 90 degrees phase shift occurs without the use of an integrator, but the receiving circuits still require differentiation.

The improved encoding technique can achieve Nyquist efficiencies of 10, 12.6, and 15.3 bits/Hz-bandwidth, or higher, for M equal to 6, 8, and 10 modulation levels, respectively. The increase in number of modulation levels over the 4 modulation levels used in the related Walker patent allows the data bandwidth to be further narrowed. A data transmission system using the improved encoding technique can enable the signal spectrum to fit within a much narrower bandwidth, for example, about 1/6 of the bandwidth of the baseband NRZ signal, and thus is usable for two-way traffic in a two-wire or radio transmission system, as well as many other applications, as will be described herein. Any value of M of 3 or greater can be used but the circuitry is simplified if even values are used.

BRIEF DESCRIPTION OF DRAWINGS

The above objects and further features and advantages of the invention are described in detail below in conjunction with the drawings, of which:

FIG. 5A is a diagram of the components of a receiving circuit in accordance with the present invention, FIG. 5B illustrates the regeneration of the encoded signal by the receiving circuit.

DETAILED DESCRIPTION OF PREFERRED EMBODIMENTS

Figure 1:
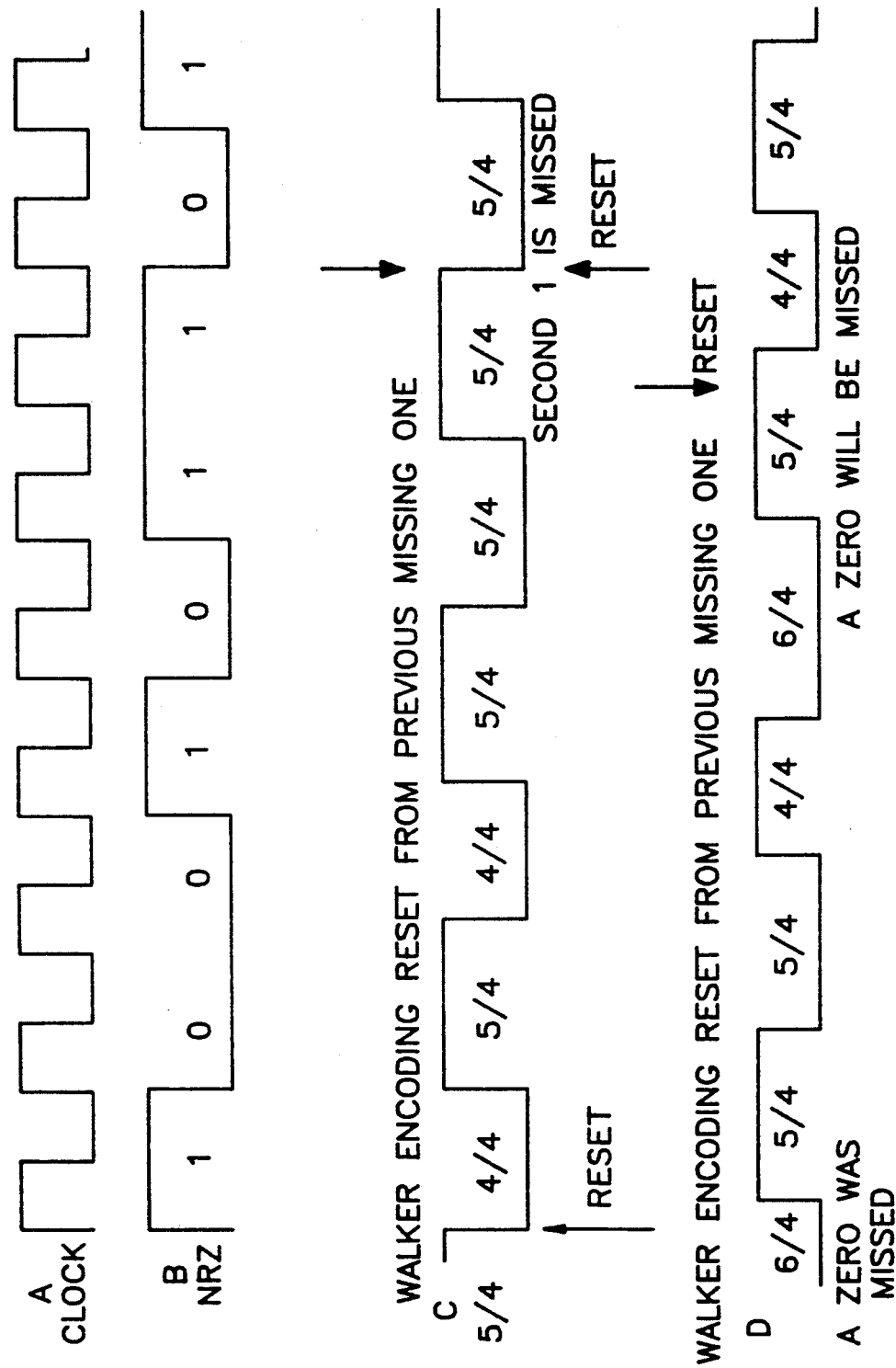
FIG. 1 is a diagram illustrating the prior encoding technique used in the binary data communication system disclosed in the Walker U.S. Pat. No. 4,742,532.
Figure 2:
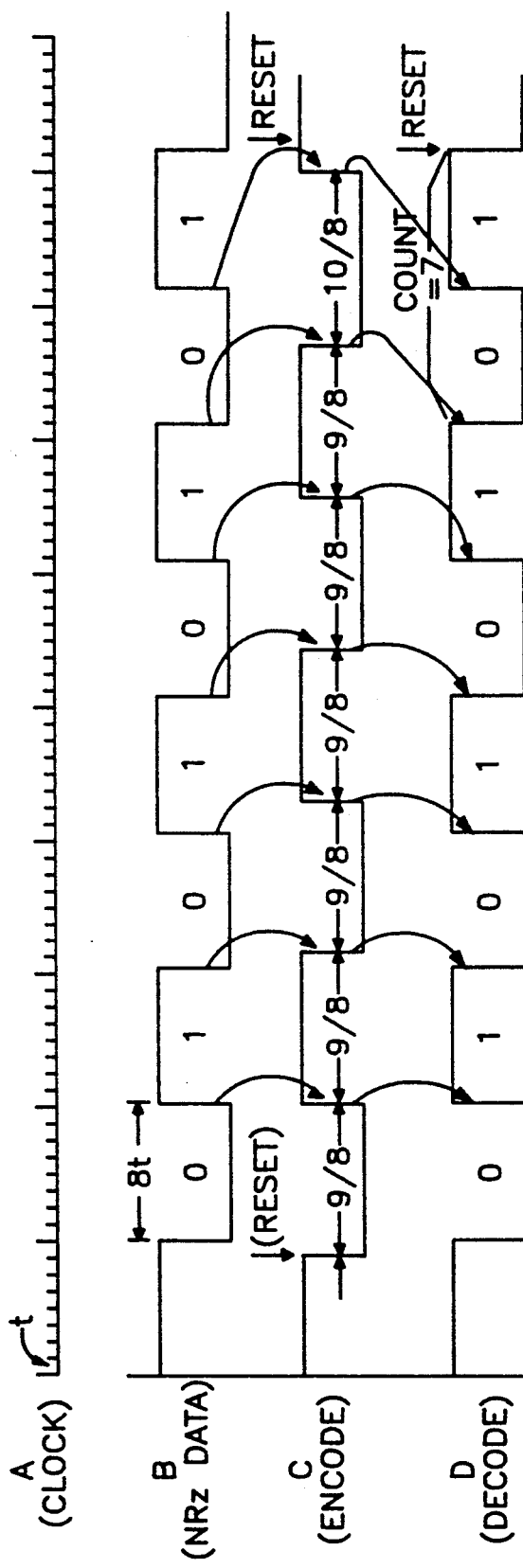
FIG. 2 is a waveform diagram illustrating an improved variable phase shift keying (VPSK) encoding technique in accordance with the present invention.
Figure 2:
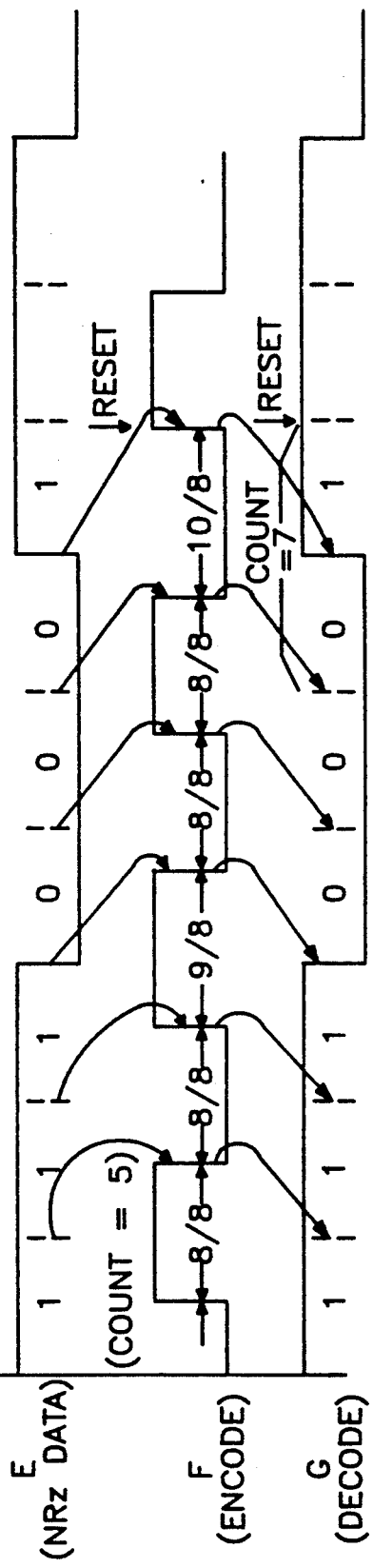

Referring to FIG. 2, there is shown two examples illustrating the encoding and decoding of a binary data signal in accordance with the improved variable phase shift keying encoding technique of the present invention. FIG. 2A shows a time scale of clock periods t of a given clock frequency. FIG. 2B shows a typical NRZ input signal having a repeating pattern of "1" and "0" data bits. In the NRZ signal format, each change of a data bit in an input stream (i.e., from "1" to "0", or vice versa) is indicated by a transition or polarity change (i.e., from "High" to "Low", or vice versa) of the NRZ rectangular wave coinciding with the leading edge of the data bit that is changed. The NRZ (non-return to zero) signal is a widely employed binary data signal used in data communications as well as in the recording of data on magnetic media, and has been fully described in literature. However, NRZ data has a frequency spectrum ranging from zero to ½ the clock frequency, and is thus difficult to record on tape or transmit over telephone wires or radio systems. Even wider frequency requirements are imposed if the original NRZ waveform is to be preserved in transmission. Various methods of encoding and decoding the NRZ signal are therefore used to reduce its wide frequency response. Reference is made to the Walker U.S. Pat. No. 4,742,532 describing some of the known methods.

FIG. 2C shows the waveform of the NRZ data encoded in accordance with the technique of the present invention. The number of modulation levels M is an even integer greater than 4. In this example, the number of modulation levels is M=8, and each data bit has a period equal to 8 clock periods. At the start of an encoding cycle, indicated by RESET, a counter is set to count M-1 (here 7) data bit polarity changes before the next RESET. Such a counter may be an up-counter which is incremented or a down-counter which is decremented with each data bit polarity change. The variable phase shift key (VPSK) encoding algorithm of the present invention proceeds according to the following rules:

1. When the present data bit is the same as the previous data bit, the encoded signal switches polarity after a rectangular wave width of M/M (here 8/8) bit period after the previous change in polarity.
2. When the polarity of the present data bit changes from that of the previous data bit (changes from "1" to "0", or vice versa), the polarity of the encoded signal switches with a width of M+1/M (here 9/8) bit periods after the previous change, and the counter is indexed by one.
3. Due to the encoded bit periods being wider than the data bit periods, after M-1 counted data bit polarity changes, the last data bit in each encoding cycle is to be omitted. Upon encountering the M-1th (here the 7th) data bit polarity change, the encoded signal switches polarity with a width of M+2/M (here 10/8) bit periods after the previous polarity change. The encoding signal then omits the last data bit in the encoding sequence. This M+2/M width is transmitted only when the pattern is 101.

At the receiving end, the encoded signal is decoded by a complementary algorithm which also restores the omitted bit which is always a zero. FIG. 2D shows the decoding sequence for the encoded signal of FIG. 2C. The decoder algorithm proceeds as follows:

1. Upon detection of a polarity switch in the received signal occuring 10/8 bit periods after the previous polarity change, the decoder transmits two bits in sequence the first is a "0" and the second is a "1". The timing is such that the extra bit is inserted to correct for the accumulated delay of the previous 7 data bit polarity changes The 10/8 period is also used to resynchronize and reset the counters of the decoder to the received data and to restore any polarity ambiguity.
2. Each polarity switch in the received signal occurring M/M (here 8/8) bit period after the previous polarity switch is decoded as a data bit which is the same as the previous data bit.
3. Each polarity switch in the received signal occurring M+1/M (here 9/8) bit periods after the previous polarity switch is decoded as a data bit which is changed in polarity from that of the previous data bit, and the counter is indexed by one.

The decoder timing is such that the insertion of the extra bit corrects for the accumulated delay of the wider periods of the encoded bits. The designation of data bit polarity changes is started with a polarity change from "0" to "1", so that the M-1th polarity change accompanied by a 101 pattern of the bits is always "0" to "1" (M is an even integer greater than 3).

Despite the longer periods of the encoded bits being transmitted, the decoded data bits are clocked from the receiving decoder at 8/8 bit periods by the decoding circuitry (to be described below). Decoded data therefore leave the decoder at a faster rate than received until the missing data bit is inserted at the end of each decoding sequence. It is the function of the decoder circuitry to restore the missing data bit and to reconstruct the data output pattern so that it has regular 8/8 bit period boundaries.

In FIGS. 2E-2G, another example shows NRZ input data consisting of alternate groups of three "1"s followed by three "0"s. The waveforms illustrate the end of the corresponding encoding and decoding sequences.

Figure 3:
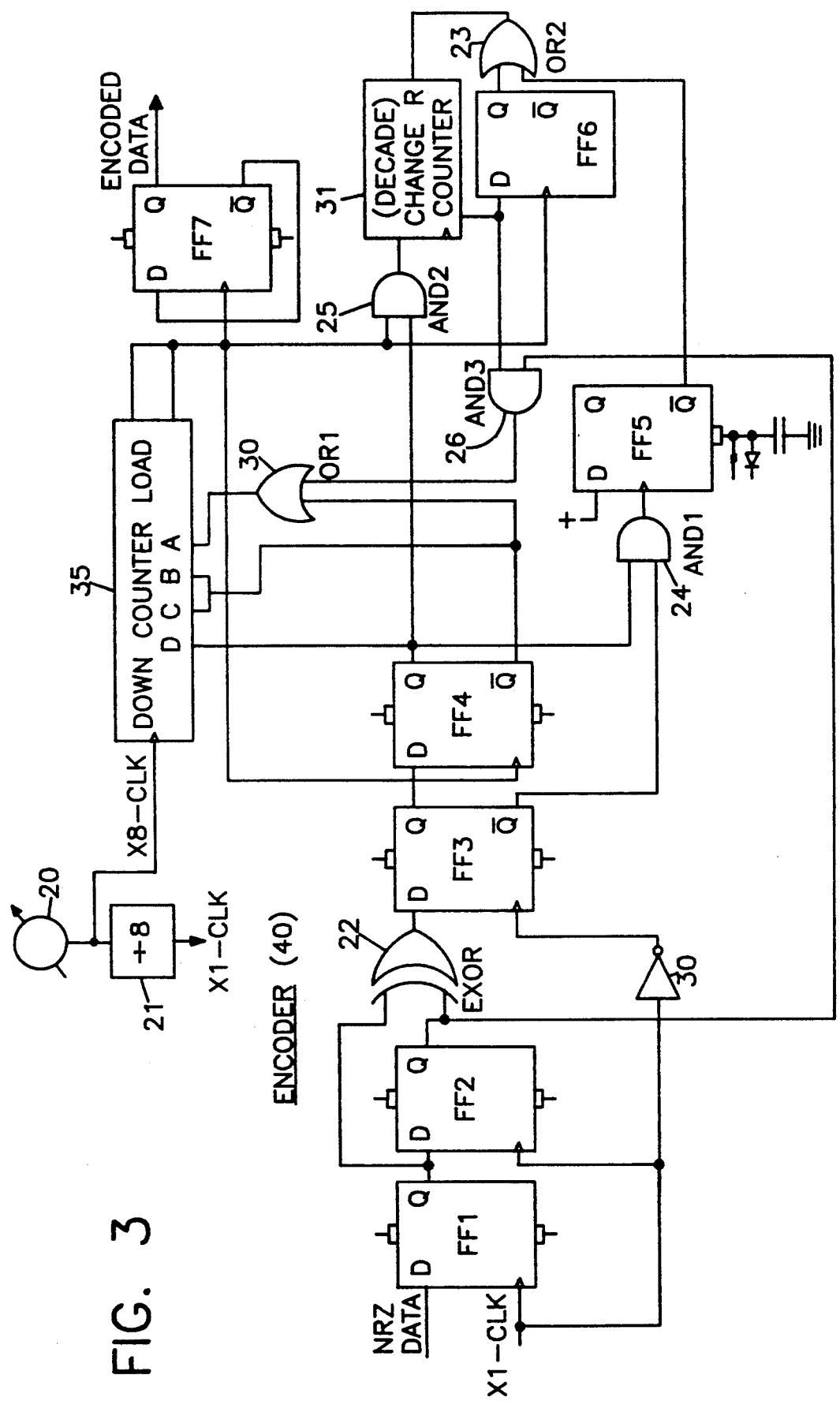
FIG. 3 is a circuit diagram of one embodiment of an encoder for implementing the encoding technique shown in FIG. 2.

Referring to FIG. 3, there is shown a circuit diagram of one embodiment of an encoder which will operate and produce the encoded signals shown in FIGS. 2C and 2F. There are of course other ways to implement the described encoding technique. For example, in the related Walker patent, a software-driven system is used to implement the encoding scheme employing 4 modulation levels and 4/4, 5/4, 6/4 polarity change width patterns. Software may also be used to implement the higher number of modulation levels in the present invention. However, encoding by software limits the upper data rate to a speed which the processor can handle. Presently, hardware in the form of shift registers, counters, gates, and flip-flops can accomplish the encoding and decoding functions at higher data rates than a software-driven system, and are therefore used in the described embodiment.

It is first noted that the encoder circuit includes a series of D-type flip-flops (FF), which are of the type having an inverter between the inputs of a clock RS flip-flop. The clock terminal acts to enable or disable the input. If the clock input is high and the D input is also high, the flip-flop is set so the Q output goes high. If the clock input is high and the D input is low, the reset input is high and the flip-flop is reset. Thus, whatever is the state at the D input, it is transferred to the Q output when the clock input goes high (leading edge). If the clock input goes low, the previous data is maintained whether D is high or low. This type of flip-flop, often called a latch, is useful in applications where a data line needs to be sampled periodically and the sample stored. The clock (or latch enable) input determines the instant when the data line D is to be enabled. The output of the flip-flop then assumes the same state as the data line until the enable input goes low, at which instant the previous data line state is stored in the flip-flop, and further changes of state on the data line do not affect the Q output. Such D-type flip-flops are well known and widely available from commercial manufacturers, and is further described in "Integrated Circuits" by M. M. Cirovic, Chapter 4 entitled "TTL", which is published by Reston Publishing Company, Inc.

Referring to FIG. 3, a clock generator 20 generates a clock signal (X8-CLK) at 8 times the data rate. It is generally a counter/divider driven by a crystal oscillator oscillating at a high frequency which is divided down to yield the X8 clock. In the example of FIG. 2, the period of the data bits is 8 clock periods long. Therefore, the X8 clock is further divided by 8 by divider 21 to obtain the data clock X1-CLK. The generator 20 is synchronized with the leading edge of the incoming data by circuitry which is well known to those skilled in the art.

Flip-flops FF1, FF2, and FF3 form a shift register in which the incoming bits are shifted to the next stages with each succeeding clock pulse. This shift register holds three bits of the incoming NRZ data so that the bits can be compared and used for encoding in the output signal according to their bit pattern. The data is clocked into the shift register by the X1-CLK. EXOR gate 22 is used to compare the first data bit at FF2 in the incoming sequence with the next bit following at FF1. Inverter 30 is used to delay the data shift from FF2 to FF3 by a ½ clock period width. If the two incoming bits are different, FF3 produces a "1" at its output to flip-flop FF4. If they are the same, the FF3 output is "0". This comparison determines whether the encoded signal bit width will indicate a data bit polarity change or not.

FF4 is used to set a counter 35, implemented in this example as a down-counter. Each time the down-counter 35 reaches zero, its output is used to clock FF4. The inputs of the down-counter 35 are set to count, as follows: A=1; B=2; C=4; and D=8. If the output from FF3 and FF4 indicates a data bit polarity change, the D input of the down-counter 35 is set to count down 8. This results in an actual count of 9 (since zero is also treated as one count). The effective count of 9 will result in the data bit polarity change being encoded in the output signal with a width of 9/8 the data bit period. If there is no data bit polarity change, the output of FF4 is reversed, and counts of 4 and 2 are set by a signal to the C and B inputs, respectively, plus an additional count of 1 set at the A input through the OR1 gate 30. The combined count is 7, resulting in an actual count of 8 (including zero), thereby resulting in an encoded width of 8/8 bit period representing no data bit polarity change.

When the down-counter 35 counts down to zero, and a polarity change is indicated by a "1" at the Q output of FF4, the AND2 gate 25 outputs a High signal to increment (or decrement) the decade (polarity change) counter 31. When the decade counter has counted to 6, which is an actual count of 7 (M−1) data bit polarity changes, it is reset through the OR2 gate 23 and flip-flop FF6 to start its count again. A reset requires a "0" on the down-counter 35 and a "6" on the decade counter 31. The RC components on FF6 cause it to generate a sharp pulse and then to return to a zero state so as not to impede the counting of the decade counter 31.

The condition triggering the end of an encoding sequence occurs when the down-counter indicates a "6" and FF4 indicates a polarity change. If FF2 indicates a polarity change following in the data stream which has not yet been clocked to FF3 and FF4, then a 1 is added to the count in counter 35 via AND3 gate 26 and OR1 gate 30. The present polarity change plus the detected following polarity change therefore causes a count of 8+1 to be set in the counter 35, for a count of 9, which results in an actual count of 10 and an encoded bit width of 10/8 bit periods. If there has been a polarity change at FF4 but no following polarity change at FF2, then only an 8 count is set via the D input line, resulting in an actual count of 9 and an encoded bit width of 9/8 bit periods. In this manner, the AND3 gate 26 is used to determine whether the next polarity change is the M-1th (7th) data bit polarity change, in order to cause either an 8 or 9 count to be set, and thereby either a 9/8 or 10/8 width to be encoded. A 10/8 width can only occur when a 101 bit pattern exists in FF1, FF2 and FF3 and the count is M−1.

As mentioned earlier, all counts in the counters are one lower than the actual counts because zero is also treated as a count. Hence, the settings of 7, 8, and 9 of the down-counter 35 are actually 8, 9, and 10 when encoded. The count of 6 at the decade counter 31 is actually 7 for the same reason. The various count-down states of the down-counter 35 are thus used to encode the different encoded signal widths. Each time the down-counter reaches 0, the flip-flop FF7 receives an input causing it to switch polarity state at that instant in accordance with the counted period width, thereby generating the desired encoded signal. The flip-flop FF6 is not essential to the operation of the encoder circuit, as it is used only on start-up. When the first data bit polarity change pattern after a reset condition occurs, a pulse is generated to ensure resetting of the decade counter 31. A reset would occur naturally after the M−1th (7th) data bit polarity change is counted, but FF6 is used to force an early start in the data stream so that the polarity ambiguity is resolved earlier. As with FF5, RC components can be used to make FF6 behave like a pulse generator.

Figure 4A:
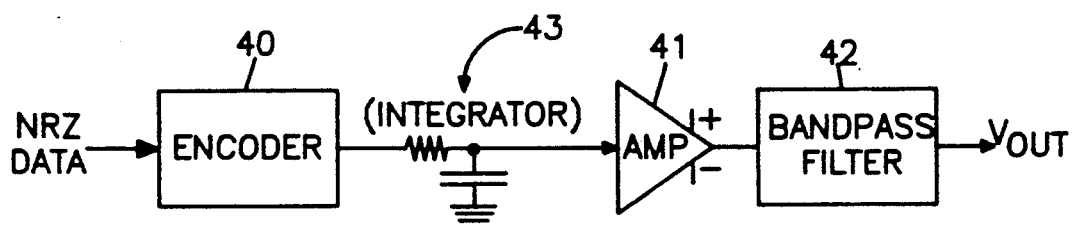
FIG. 4A is a diagram of a data transmission circuit incorporating an encoder as described with respect to FIG. 3.

In FIG. 4A, a typical data transmission circuit is shown incorporating an encoder 40 as described above. The NRZ data is input to the encoder 40, and the encoded output is coupled through an integrator stage 43, having integrator resistor and capacitor elements, to the input of an amplifier 41. The amplifier output is coupled to a bandpass filter 42 which is configured to remove the second, third, fifth, and higher order harmonics from the encoded signal, so as to result in a sine wave output $V_{out}$. The data can then be transmitted as single sideband suppressed carrier phase modulation, in which only the J1 Bessel product is transmitted.

Figure 4B:
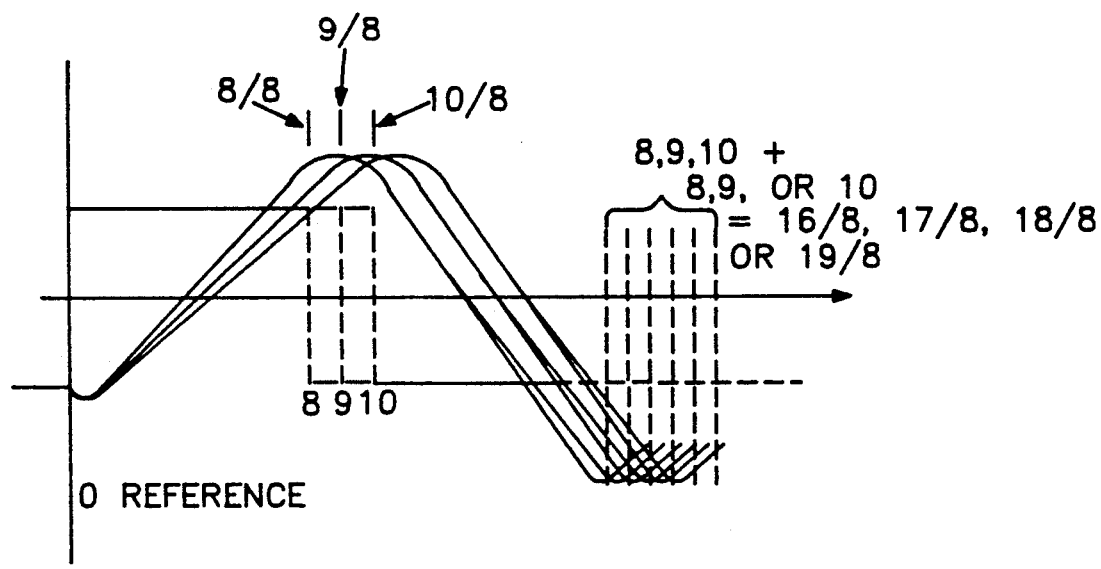
FIG. 4B illustrates the waveform output of the transmission circuit.
Figure 4C:
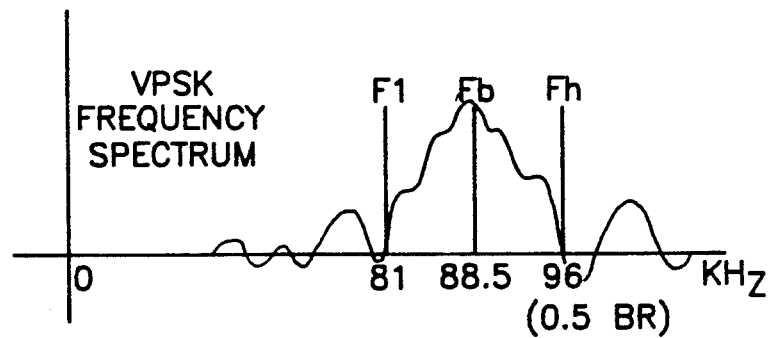
FIG. 4C illustrates the frequency spectrum of the transmission output.

As illustrated in FIG. 4B, the sine wave output $V_{out}$ is phase shifted 90 degrees relative to the rectangular-wave encoded signal (in dashed lines), hence its peaks represent the data bit polarity change points. The peak and dip of each sine wave thus correspond to two polarity change points. The frequencies of the individual waveforms of the sine wave output are determined by the relationship $F=1/T$, where T is the duration of one positive polarity period plus one negative polarity period. The possible periods according to the encoding rules described above are 16/8, 17/8, 18/8, and 19/8 times the bit period (baseband form). For a data transmission rate of 192,000 bits per second, for example, the frequencies involved are 96 KHz, 90.35 KHz, 85.33 KHz, and 80.84 KHz. The resulting frequency spectrum is shown in FIG. 4C, ranging between about 81 KHz and 96 KHz and having a center frequency of about 88.5 KHz. The indicated side lobes of the frequency response are removed by filtering, as described above.

The improved VPSK encoding of the present invention does not follow the same relationship of $2^N=M$ bandwidth relationship of the conventional data transmission methods. However, the Nyquist Factor can be calculated similar to the calculation used for the conventional methods. In BPSK coding, the phase is shifted + or − pi/2, or 90 degrees. In MPSK it is pi/2. There are certain characteristics which follow through for the improved VPSK technique of the invention, including the trellis effect and phase continuity. In VPSK, the phase of the modulated R.F. signal is shifted ±Pi/2 and the change in pulse widths produces a subcarrier whose phase is shifted an amount approximately equal to the lower number of the coding level. In 8/8, 8/9, 10/9 coding, for example, the phase is shifted a Nyquist Factor of pi/8, or about 22.5 degrees for a Nyquist Factor of 12.6, instead of 3 as would be indicated by the $2^N=M$ relationship.

The Nyquist Factor is calculated as follows. The instantaneous value of signal frequency F varies from 8/16 to 8/19 of the bit rate (BR). The average value Fb is about 8/17.5 BR, or 0.46 BR. The high value is Fh $=8/(8+8)$ BR, or 0.5 BR. The low value is $Fl=8/(10+9)$ BR, or 0.42 BR. The difference between high and low values is 0.08 BR for the range of frequency changes, which is equivalent to a Nyquist Factor of 12.6 bits/Hz-bandwidth (1/.08=12.6).

The phase change in VPSK after filtering is not fixed between encoded bits, i.e., the phase change from 8/8 to 9/8 bit period is not the same as from 9/8 to 10/8 bit period. The phase change value of beta is therefore variable within the trellis, hence the term Variable Phase Shift Keying. At very high Nyquist Factors, this change difference becomes minimal.

Other VPSK indexes and periods may also be employed within the principles of the present invention, for example, 6/6, 7/6, 8/6 (M=6) indexing, or 10/10, 11/10, 12/10 (M=10) indexing, or higher M numbers. Odd values of M are possible but not used due to the processing complexity. The compression limitation for the technique of the invention is the resolving ability of the decoder/detector on the receiving end. In the above described 8/8, 9/8, 10/8 example, the decoder/detector must have a resolution factor of about 12%, i.e. the detecting circuit must be able to detect a change of 12% or less. A higher resolving power would be required for a 10/10, 11/10, 12/10 system. For higher values of M, the improved noise rejection might be counteracted by an increased bit error rate (BER). In the present example, the 12% resolution factor represents the 22.5 degree phase change. An error can result if noise causes more than 10 degrees of interference (phase error).

Assume, for example, that communications at 192,000 bits per second is transmitted in a bandwidth of 15 KHz lying between 81 and 96 KHz. The data must be sampled at an equivalent rate of 192 KHz and all modulation products represented in the data format must lie within the band. The worst case interference will arise when the signal frequency is at one end of the passband, and an interference frequency is at the opposite end of the passband. The worst case frequency difference of 15 KHz, sampled at the rate of 192 KHz, would reduce the phase change of the interference by a factor of 192/30. Thus, an interfering signal representing a + or −30 degrees phase change at 15 KHz would cause less than a 5% phase change with each successive zero crossover or peak at 192 KHz. Thus, the narrow bandwidth and high compression efficiency of the present invention are particularly well suited for data communication systems utilizing both wire and radio communications links because the effect of interference is reduced. It can be shown that there is no signal to noise degradation with increasing values of M.

Figure 5C:
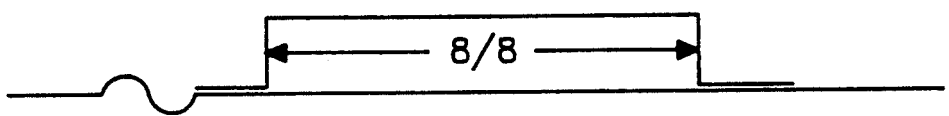
FIGS. 5C to 5E show the encoded signal with their restored modulated widths.
Figure 5D:
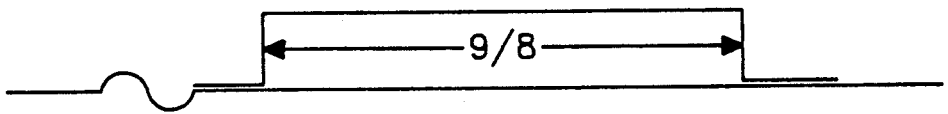
Figure 5E:
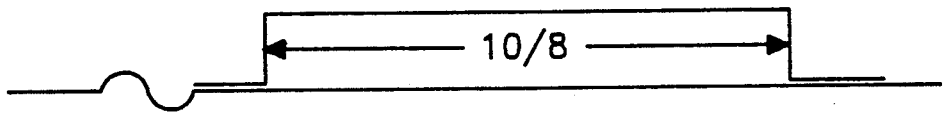

Referring to FIG. 5A, a receiving circuit is shown for receiving the transmission of the encoded signal and decoding the same. The encoded signal is input to a bandpass filter 50 for reducing noise, and the output thereof is applied to a zero crossover detector circuit 51 which includes at the input thereof a differentiator 51A coupled to a comparator 51B for comparing the signal to a reference potential (ground). The output of the crossover detector 51 is coupled to the input of a decoder 52 (to be described further below) which the regenerated NRZ data at its output.

The zero crossover detector is a well known circuit, and many examples of such circuits exist. The function of the zero crossover detector is to determine the points at which a repeating waveform crosses the zero level, and to produce an output each time this occurs. Many examples of zero crossing detectors are known in the art. Commercially available chips such as the Motorola 3470 perform this function internally. Operational amplifiers and other comparator devices also qualify for performing this function. For zero crossing detection, the received signal is differentiated, so that its peaks are shifted 90 degrees in phase and become zero crossings. The 90 degree phase shift introduced by the integrator of the transmission circuit of FIG. 4A is thus cancelled by the differentiator of the receiving circuit of FIG. 5A. The invention combines the phase shift of the data information to the peaks of the sine wave output on transmission, thus allowing other frequency components to be filtered out, and a complementary restoration of the peak information to zero crossings using the zero crossover detector upon reception.

The zero crossover signal thus restores the signal to a pattern of + and − levels with abrupt transitions corresponding to the zero crossings, as illustrated in the waveforms of FIGS. 5B to 5E. These waveforms represent a restoration of the 8/8, 9/8, 10/8 encoded signal, such as shown in FIGS. 2C and 2F. The overall effects of noise in transmission is greatly reduced because the sampling rate for the zero crossings occur at rates which are significantly higher than the beat frequency with the noise present (vector sum).

Figure 6:
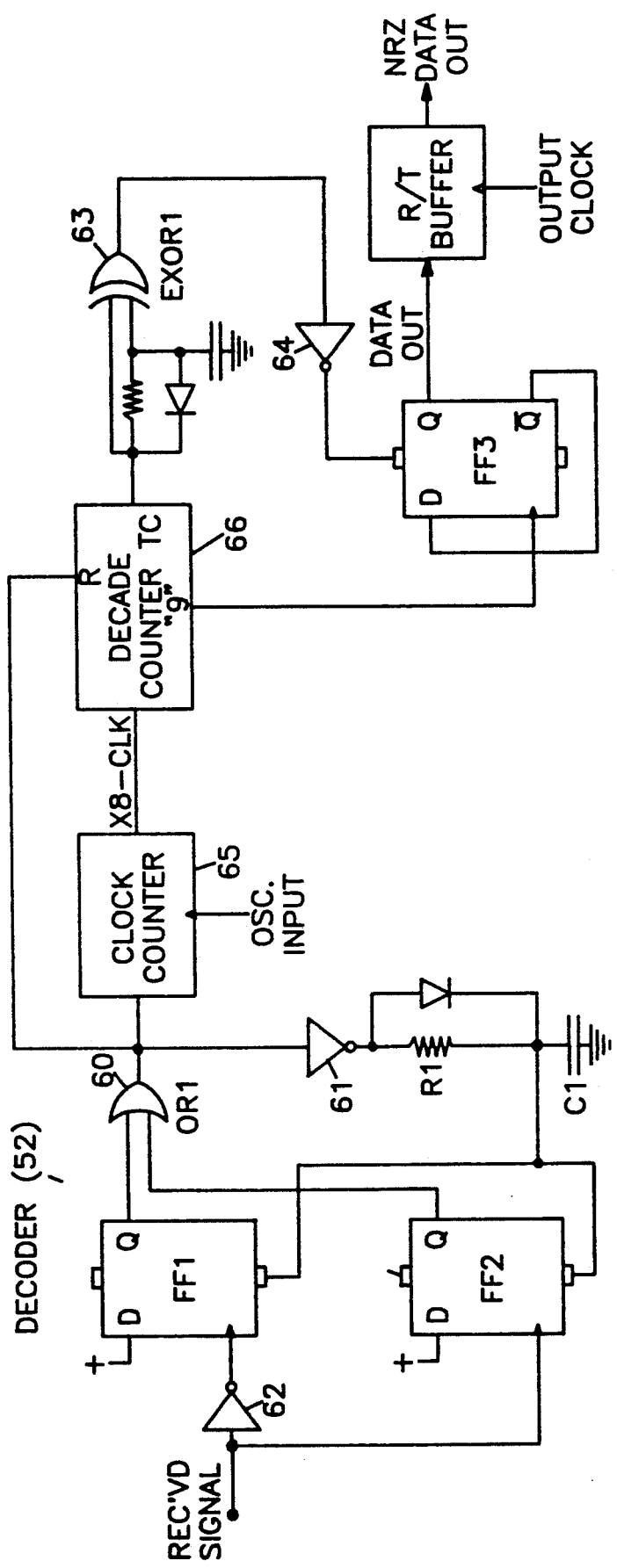
FIG. 6 is a circuit diagram of one embodiment of a decoder for decoding the transmitted encoded signal in accordance with the invention.

Referring to FIG. 6, one example of a decoder 52 for use in the receiving circuit of FIG. 5A is shown having an input for the received encoded signal applied to flip-flop FF1 through an inverter 62 and to flip-flop FF2. FF1 and FF2 are coupled to form a bidirectional one-shot pulse generator. The pulse is set to be of sufficient duration to reset the clock counter 65, but not long enough to interfere with its counting. The pulse duration is set by the inverter 61 and the values of the resistor R1 and capacitor C1.

The clock counter 65 is driven by an oscillator input, generally at an oscillation frequency many times higher (e.g. 128 times) than the bit rate (X1-CLK rate). In this example, it produces a clock signal X8-CLK which is 8 times the bit rate. The counter 66 is a decade counter which is reset by the same reset pulse as clock counter 65. The reset pulse is derived from the incoming data via OR1 gate 60. Flip-flop 3 uses the output of the decade counter 66 indicating a count of 9 as a clock input and a count of 10 as a set input. EXOR1 gate 63 is used as a pulse generator to provide a pulse of short duration, which is delayed through the inverter 64.

When the pulses coming from OR1 gate 60 indicate a signal width of 8/8 bit period, the decade counter 66 is reset, and there is no 9 output or 10 output from the TC output of decade counter 66. FF3 therefore holds its last state. When the incoming pulse has a 9/8 period, the "9" output appears, and FF3 reverses state, indicating a change from "1" to "0" or vice versa. If there is no reset on the count of 9, the "9" output appears, followed by a "10" output at the TC output. The "9" output causes FF3 to clock out a change to "0". This change is followed ½ period later by a change to a "1" indicating a "resynchronize" condition. The "0" is the missing bit, and the "1" is the current bit. The decoder circuit through EXOR1 and FF3 thus performs the insertion of the missing bit after the 7 polarity changes automatically by waiting until the receiving R/T device has clocked in a "0", then restoring synchronization and the polarity of the following (last) data bit to a "1" when the "10" count appears at the TC output of the counter 66. If no "10" count appears, a "0" followed by a "0" is clocked out.

The output of FF3 is not a pure NRZ output because the recovered bits may be shorter than a normal bit width. The output of FF3 may be fed to a buffering device, such as a receiver/transmitter chip or a shift register which is part of the R/T chip. The R/T chip is clocked at the X1-CLK data rate. The phase or the timing of the output clock is adjusted to read out the output of FF3 as a standard NRZ signal. Such R/T devices are made by various manufacturers, e.g., under the designations SIO, UART, USART, etc. Typical devices are the 8251 and 2651 chips made by Signetics. The clocking circuitry and its phasing are known to those skilled in the art, and are not described in detail here. The clock for the R/T device can be synchronized from the TC output of decade counter 66. Those skilled in the art will recognize that timing in these circuits is critical since data cannot be clocked to a next stage until it is stable at the output of the preceding stage. The timing can be greatly influenced by transmission delay through the integrated circuits.

The improved VPSK coding of the present invention using 8/8, 9/8, 10/8 encoding obtains a Nyquist Factor of 12.6 which is much higher than conventional methods. Other values for M and corresponding encoding levels may also be used. For example, M=6 and 6/6, 7/6, 8/6 encoding have obtained a Nyquist Factor of 10 and a BER of $1 \times 10^{-8}$ with 13 dB C/N. In contrast, the QAM method would require a C/N ratio of 40 dB and 1024 modulation levels for the same Nyquist Factor. This factor alone represents a signal-to-noise improvement of 60 or 70 to 1 over present methods.

As the number of modulation levels increases, even higher Nyquist Factors are obtainable in principle close to or exceeding the theoretical limit, i.e. N=18, for the VPSK method. At the higher modulation levels, the linearity of the system filters becomes more important. In the case of conventional methods, the upper compression limit is about 10/1 for currently available filters. Since the present invention reduces the number of modulation levels required for a given Nyquist Factor in relation to conventional methods, the upper compression limit is raised for the same filter linearity. Compression ratios as high as 23 bits/Hz have been obtained in tests of the disclosed encoding technique. Table I below summarizes the results obtainable with different levels of M in accordance with the invention, where M is an even integer greater than 3:

| M (Modulation Levels) | Nyquist | Beta (Phase Change) Radians |
|---|---|---|
| M = 6, 6/6, 7/6, 8/6 | 10 | 0.5 |
| M = 8, 8/8, 9/8, 10/8 | 12.6 | 0.39 |
| M = 10, 10/10, 11/10, 12/10 | 15.3 | 0.314 |
| M = 12, 12/12, 13/12, 14/12 | 18.2 | 0.25 |

It is noted that N is approximately 1.5M and does not follow the $2^N = M$ rule.

The present invention also has the advantage of narrowing the bandwidth for transmission of data even at the high data rates herein. An NRZ signal conventionally occupies a spectrum between zero and ½ the bit rate. At a bit rate of about 200 Kb/s, the data bandwidth using conventional methods occupies about 100 KHz. Various methods have been used for reducing the spectrum between zero and ½ the bit rate, e.g., Biphase (single density disk) recording, Manchester codes, and the MFM (double density disk) method, which are explained, for example, in Woo U.S. Pat. No. 3,325,855. Unfortunately, these methods increase the necessary spectrum in the region above ½ the bit rate and are not suitable for RF or narrow band transmission.

In accordance with the invention, the improved VPSK encoding has a compressed spectral response, e.g., for 192 Kb/s using 8/8, 9/8, 10/8 encoding as shown in FIG. 4C. This spectrum has the characteristic of the signal energy being compressed into an island just below the ½ bit rate, i.e. 96 KHz. This island is actually the J1 Bessel function product. The signal energy at portions outside the island from 81 to 96 KHz is only a small fraction of the total signal energy and is filtered off. Only the portion within the island is transmitted. For R.F. modulated carrier transmission, the carrier and other sideband would be restored at the receiving end. With the side portions removed, the signal bandwidth is about 15 KHz, which is about 1/6th the bandwidth that would be occupied by conventional methods. All signal energy above −26 dB lies within the narrowed bandwidth which corresponds to a Nyquist Factor of 12.6 bits per Hertz of bandwidth.

Figure 8A:
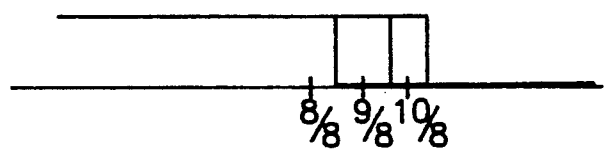
FIGS. 8A and 8B illustrate the encoded signal distorted by phase and group delay changes as compared to the signal adjusted by the bandpass filter of FIG. 7A.
Figure 8B:
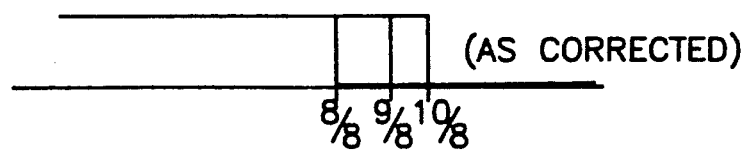

In any transmission circuit there are unavoidable data path phase or group delay changes which can distort the signal pattern. As shown in FIG. 8A, the bit width boundaries of the signal as received may not coincide with the signal 8/8, 9/8, 10/8 boundaries as encoded. It is desirable to correct these distortions where possible such that the signal pattern coincides with the desired boundaries, as shown in FIG. 8B.

Figure 7A:
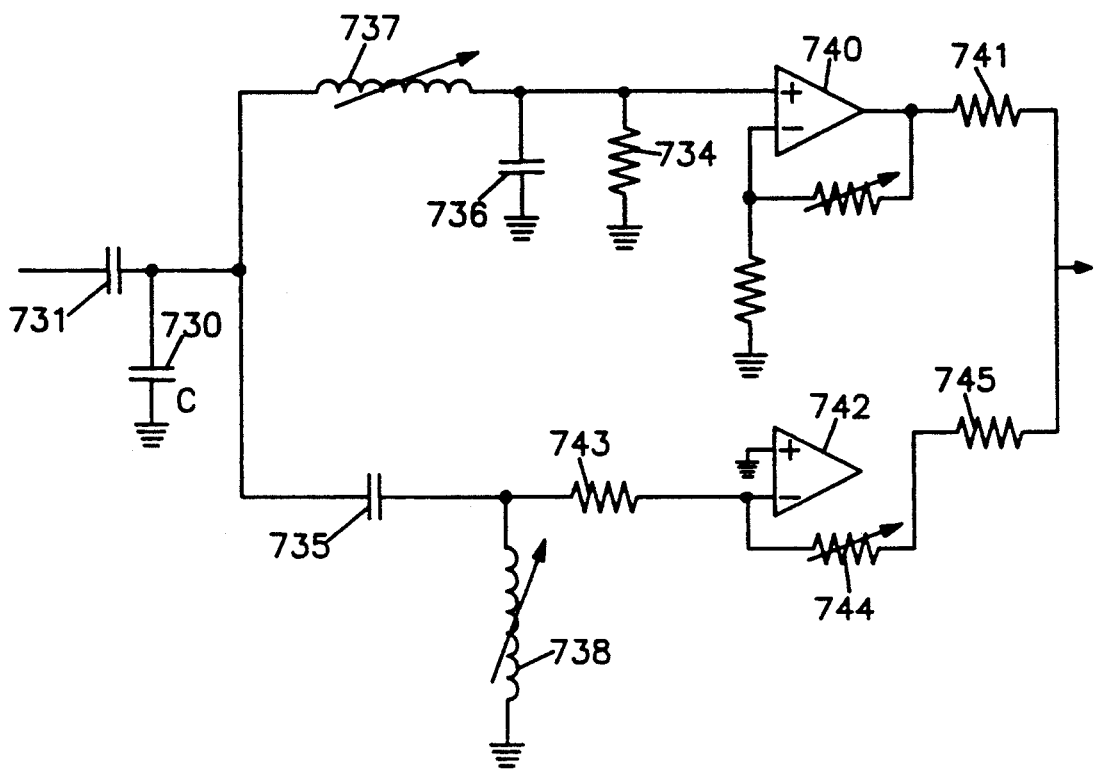
FIG. 7A is a circuit diagram of a preferred bandpass filter in the data transmission circuit of FIG. 4A for compensating for phase and group delay changes in the transmission circuits.
Figure 7B:
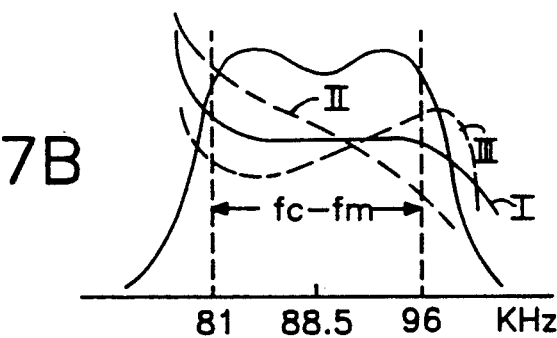
FIG. 7B illustrates the frequency response of the bandpass filter.

Referring to FIG. 7A, there is shown a special bandpass filter which is employed with the transmission circuit of this invention. The bandpass filter is fully described in U.S. Pat. No. 4,742,532, which is incorporated herein by reference. The bandpass filter exhibits a uniform phase and group delay characteristic (curve I) over the center of the passband, as illustrated in FIG. 7B. However, the filter characteristics can be tuned slightly to one side or the other, in order to produce a phase tilt pattern with a lead or lag (curves II and III) that can be adjusted to compensate for the effects of changes in the transmission circuit.

Referring to the bandpass filter circuit depicted in FIG. 7A, the input from the amplifier 41 of FIG. 4A is applied to capacitor 731 which has one terminal coupled to capacitor 730. Capacitor 730 is large in relation to capacitor 731, e.g. ten times or more larger. The capacitor 730 is shared by two resonant circuits operating at different frequencies and must be large to minimize interaction. A first signal path is through a lowpass filter including a variable inductor 737 and a capacitor 736 tuned to an upper frequency limit which may be, for example, 91 KHz. A second path is provided through a high pass filter including a capacitor 735 in series with a variable inductor 738 tuned to a lower frequency limit which may be, for example, 85 KHz. The filters are loaded so as to adjust the Q (quality) factor of the resonant circuits, and operate independently of one another.

A signal larger than that coming from the input source will appear at the inputs to the respective amplifiers 740 and 742. The gain of the amplifiers is adjusted by variable resistors coupled between their input and output. The gain of each amplifier is adjusted to balance the two outputs. The series circuits are stagger tuned and adjusted in Q to provide the desired bandwidth. At frequencies which give a phase shift of more than 45 degrees above and below resonance, the signals at the mixing resistors 741 and 745 are nearly equal in amplitude and cancel in phase. Therefore, they accentuate the sharpness of the bandpass filter giving greater than expected selectivity for a four pole filter.

At frequencies near resonance, with the circuit elements slightly stagger tuned, the phase shifts to + or −90 degrees in the two resonant circuits. One operational amplifier 742 inverts its signal so that the signals across resistors 741 and 745 that are in phase add. As the frequency varies above and below the center, the phase shifts away from in-phase but in opposite directions, i.e., one going positive and the other negative. Since they are added, the effect is to cancel phase shift until the skirt of the filter is reached.

Over a narrow range, the two signals are additive and result in a summed output of uniform phase shift (flat phase shift). An abrupt phase departure from uniformity occurs at the −6 dB points on the bandpass shoulders. The filter gain and phase characteristics can be adjusted as shown in FIG. 7B. The gain characteristics of the filter are due to the resonant frequencies of the lowpass filter as compared to the highpass filter. The lowpass filter is tuned to 91 KHz while the highpass filter is tuned to 85 KHz, giving the bandpass as indicated. Only the frequencies between 81 KHz and 96 KHz are passed. By adjustment of the bandpass filter, the polarity changes (sine wave peaks) of the signal to be transmitted can be shifted to occur at the proper boundaries, as indicated in FIG. 8B.

The above-described embodiments do not use a modulated carrier wave for transmission, but rather use the sine wave output signal itself. Thus, the system is used for applications of the encoded signal at its baseband frequency, as contrasted to an R.F. modulated signal. However, the principles of the invention can be readily applied to R.F. modulated signals for radio transmission, as well as to signals used in conjunction with data recorders, telephone line modems, and frequency modulation subcarriers for FM transmission.

In the transmission of digital data over wire or radio links, the effects of fading, interference or noise on the transmitted signal are of great concern. The undesirable noise can cause increased bit error rates, hence an effort is made to improve the signal-to-noise ratio (SNR). In the present invention, the signal bandwidth is reduced to a minimum, while the data rate is increased, thereby reducing the effect of noise even for high data rates on the transmitted signal. The invention thus permits a data communication system with a radio link that employs extremely high data rates at low bit error rates, as compared to the systems of the prior art.

The narrow bandwidth and high data compression efficiency of the improved VPSK encoding/decoding technique of the invention are particularly suited for two-wire transmission of data at the data rates established for Integrated Services Digital Networks (ISDN) over twisted-pair wires. The use of ISDN equipment with an "S" interface presently requires a four-wire system transmitting data at higher frequencies and through a broader bandwidth as compared to those obtained in the present invention. It is well known that twisted-pair wiring can carry very high frequencies for limited distances. However, higher frequencies have greater line loss than lower frequencies. The present invention achieves an advantageous effect by reducing the frequencies and bandwidth involved and allowing transmission on two-wire systems. The reduced frequency response of the encoded signal preserves the signal level in two-wire systems. Broader bandwidths result in greater phase change variation over the bandwidth, and therefore present a greater problem of line equalization or phase compensation. Thus, the narrower bandwidth of the encoded signal of the invention reduces the effect of phase change distortions.

Figure 9:
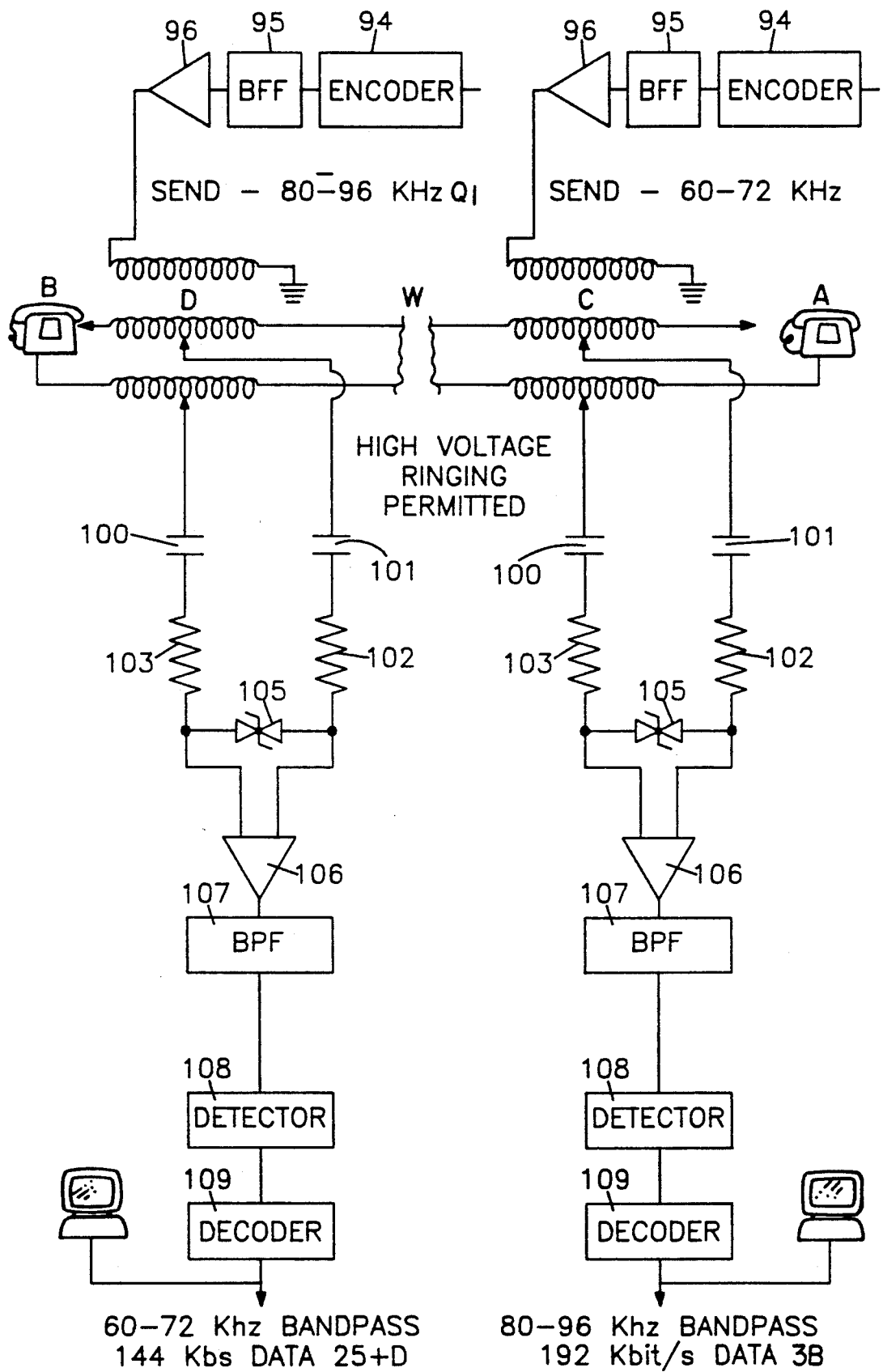
FIG. 9 is a schematic diagram of a data transmission system for the improved encoding technique of the invention using a two-wire telephone link through a modem.

Referring to FIG. 9, there is shown a practical embodiment of the invention as applied to twisted-pair two-wire telephone systems. A modem is connected to the telephone line at terminal positions where ISDN service is required. The connection does not affect normal analog telephone service in the low frequencies that are used, and the normal ringing capability is preserved. In contrast, these functions are lost in the conventional ISDN circuit using four wires, or in a circuit where voltage levels must be reduced to those tolerated by an integrated circuit. The noise reducing capability discussed above is also preserved.

The modem as used in FIG. 9 can be used in buildings where it is difficult and costly to rewire the telephone system. It permits dial-up ISDN service over the existing two-wire installations of a private branch exchange (PBX), but it transmits data at 10 or more times the data rate of normal modems. The same concept can also be used to transmit data over conventional power lines, such as 60 Hz lines.

The two-wire telephone/modem system functions as follows. Telephone A places a call via the private branch exchange W to telephone B. The lines connect in the normal manner. Telephone B rings and is taken off-hook in the normal manner. Voice connection between A and B is thus established, but in addition a data connection is established via hybrid transformers C and D. Station A can send data at 192 Kb/s through its encoder 94, bandpass filter 95 (which may be the special circuit of FIG. 7A), and amplifier 96. The amplifier 96 has its output terminal coupled to one winding of the hybrid transformer C.

Data transmitted through the hybrid transformer C is coupled via the branch exchange W to the hybrid transformer D at station B. The hybrid transformers include a circuit for DC isolation using capacitors 100 and 101, and isolating resistors 102 and 103, which are voltage protected by back-to-back Zener diodes 105. The data is applied to an amplifier 106, coupled to a bandpass filter (which may also be of the type shown in FIG. 7A), and decoded through detector 108 and decoder 109 to the terminal T.

In a similar manner, data can be transmitted from telephone B via the branch exchange W to the telephone A and its corresponding terminal. The two stations are arranged to send and receive data signals at different frequencies for separate channels in two-way communications. The terminal at station A is arranged to send encoded data in the band of 60 to 72 KHz (data rate of 144 Kb/s), and to receive and decode data in the band of 80 to 96 KHz (data rate of 192 Kb/s), both of which are within ISDN specifications. Conversely, the terminal at station B sends data at 192 Kb/s, and receives at 144 Kb/s. Normally, the 144 kb/s channel is referred to as "2B+D", where a B channel has 64 Kb/s capacity and the D channel has 16 Kb/s capacity. The 192 Kb/s channel is referred to as "3B". To equalize the channel capacities, the extra 48 Kb/s capacity of the 192 Kb/s channel can be ignored, or it can be utilized for additional functions of a one-way nature, such as defined by the ISDN standards for C and Q channels.

Alternatively, hybrid transformers (as designated at C and D) are well known which permit two-way conversation on telephone lines utilizing the same frequency band. The same principle can be used here to provide two-way data communication at the same data rate if the impedances of the line in both directions can be balanced. The data processing circuitry for data communication systems, such as multiplexers, combiners, separators, etc. are not a part of the present invention and are not shown.

The above technology is also applicable to telephone line modems which do not permit simultaneous voice transmission. Excellent noise reduction characteristics are obtained at 4800 baud. The detector circuit in FIG. 9 is typically a disk-read amplifier, such as a Motorola 3470 unit, which was described with respect to the circuit of FIG. 5A and is also used in the following disk recording application.

Recording of data on magnetic tapes or disks requires altering the magnetic medium so that the recording signal is impressed on the media and is recoverable as nearly representative of the original signal as possible. One problem with magnetic recording is phase distortion and amplitude distortion which limit the upper frequency response of the recording device. This phenomenon is well known for disk recorders, and some form of prewrite compensation is required for denser data recording.

It is a feature of the present invention, as applied to data recording, that data is encoded within a narrow frequency band, typically one-third that of the normal double density recording schemes, and therefore allows a minimal phase change within the data pattern. There is also minimal amplitude change. Also, due to the narrow bandwidth, no precompensation is required. As a result, the encoded waveform can be easily recorded on tape or disk at densities of bits per inch which are 50% to 100% greater than that achievable by other means.

The invention can be readily applied to a transmission system using an amplitude-modulated carrier frequency. An R.F. system using an encoded signal for phase modulation was described in the related Walker U.S. Pat. No. 4,742,532. In the patent, a method was disclosed in which the encoded data signal was used to create a 180 degree phase change modulated signal, which was passed through a narrow band filter that rejected the carrier, all of one sideband, and all harmonics of the modulating signal greater than the fundamental frequency. The resultant signal spectrum was similar to a phase-modulated single-sideband signal in which only a portion of a sideband centered around a narrow frequency spectrum was transmitted.

Figure 10:
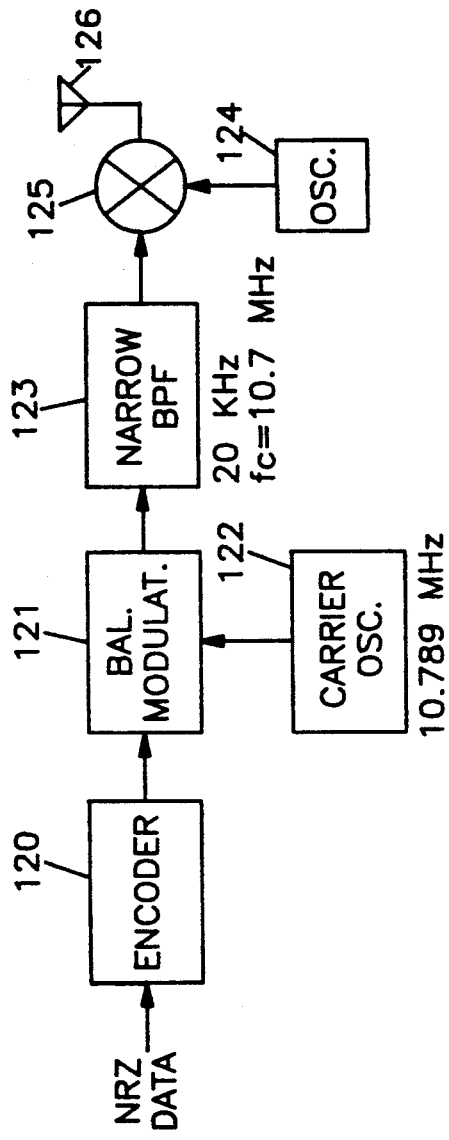
FIG. 10 is a diagram of an R.F. modulated carrier transmitter system using the improved encoding technique of the invention.

A radio transmitter system which transmits the aforementioned single-sideband signal is illustrated schematically in FIG. 10, having an encoder 120 for the NRZ data, a balanced modulator 121 for modulating a carrier signal from the oscillator 122 with the encoded signal, a narrow bandpass filter 123, an oscillator 124 and mixer 125 for generating the frequency to be transmitted, and a transmitting antenna 126. A receiver front end, shown in FIG. 11, includes a receiver antenna 130 and superheterodyne receiver unit 131 for tuning to the transmitted signal at the given frequency, a tuned I.F. filter 132 for the data modulated signal, a limiter 133, a product detector which derives the product signal from reinsertion of the carrier frequency from the oscillator 135, and a bandpass filter 136. In product detectors used for SSB-AM reception, the output frequency of the detected signal depends on the frequency of the reinserted carrier. However, there is no carrier in the received signal of the present invention, since the carrier is filtered off. Instead, a substitute carrier is generated to make the incoming data rate match that of the data signal. The carrier is derived from a phase locked loop comparing the received data rate with the data rate clock of the receiving device. The substitute carrier may vary from the transmitting carrier by several parts per million. While close to the original carrier, it may not match it in frequency or phase, and therefore may hunt around a center value in order to keep the incoming data rate constant to match the data clock frequency in the receiving device. The extracted data signal is then passed to the differentiator/decoder circuit as described with respect to FIG. 5A.

Figure 11:
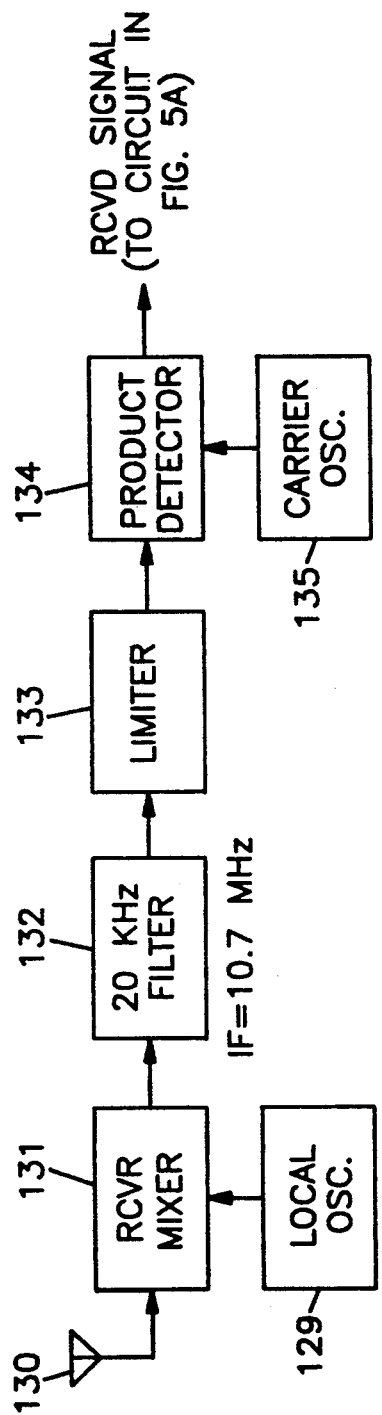
FIG. 11 is a diagram of an R.F. modulated carrier receiving system for extracting the received data signal from the transmitter of FIG. 10 for decoding in accordance with the invention.
Figure 12A:
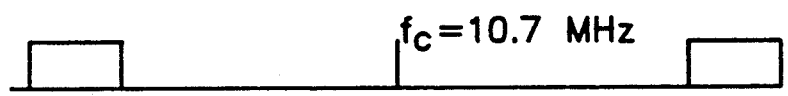
FIGS. 12A to 12C illustrate the signal spectrum for the R.F. modulated carrier transmitter and receiving systems.
Figure 12B:
Figure 12C:

FIG. 12A depicts the overall spectrum of the double-sideband modulated R.F. signal at the modulator, FIG. 12B depicts the encoded single-sideband portion transmitted, which is only the $j_1$ Bessel product of the modulating signal, and FIG. 12C depicts the restored overall spectrum at the output of the product detector 134 in FIG. 11. The operation of the various circuits for single-sideband transmission are well known to those skilled in the art, including the ability of the product detector to restore missing sidebands.

It is a further feature of the invention that multipath distortions in R.F. transmission are reduced because of the narrowed bandwidth. The high Nyquist Factors applicable to the use of the encoded data at baseband frequencies of 81 to 96 KHz in the previously described examples hold true in this application where the signal is transmitted as a single-sideband signal. The same noise reducing characteristics also apply, because any noise must lie within the filter bandpass where it beats with the signal. The beat frequency is lower than the sampling rate, hence the noise reducing effect is achieved.

As another application of the invention, the above technology can be used to broadcast data or voice/data/facsimile, etc. over FM subcarriers. In FM broadcasting, the present practice is to utilize frequencies centering around 67 KHz and 92 KHz as subcarriers of information. The subcarriers are modulated to transmit data at rates up to 19.2 Kbits/second. In the present invention, the equipment shown in FIGS. 3 and 4A can be used at the FM subcarrier frequency. Thus, the present invention can be used for FM transmission of data at 192 Kb/s within the presently allowed rules of the FCC. The present invention utilizes baseband frequencies very close to the subcarrier frequencies, but is capable of sending data at rates of 192 Kbs/second in the same bandwidth, thereby affording a data rate improvement of over 10 to 1, compared to presently used methods.

The frequencies used for ISDN service at 144 Kb/s and 192 Kb/s are approximately the same as the 67 KHz and 92 KHz subcarriers presently in use for FM transmission. The difference is that the modulated FM subcarrier signal represents the actual encoded data after filtering, rather than a modulated subcarrier frequency. A standard FM receiver of high quality can be used prior to the receiver/decoder circuit of FIG. 5A, so that there is minimal distortion and cross talk of the normal audio signals that can cause interference with the encoded data. Some distortion and phase correction can be accomplished by using the filter design of FIG. 7A.

It is well known to those skilled in the art that interfering signals from the main stereo entertainment channels extend into the FM subcarrier bands described above, and that this interference can cause serious degradation of the bit error rate for data communication. In the present invention, this interference is reduced by a factor of 6 or more by the high sampling rate and narrow bandpass of the encoded signal.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. An encoder apparatus for use in a high speed data transmission system for transmitting an input NRZ signal over a communications path as a data signal, said NRZ signal representing a series of binary data bits of "1" and "0" polarities clocked at a given clock rate, comprising:

polarity change detecting means responsive to said NRZ signal for detecting whether a current data bit of said NRZ signal has the same or a changed polarity as a previous data bit, wherein each data bit of said NRZ signal has a bit period of M clock periods;

counting means for maintaining a count of the number of polarity changes of the data bits in each encoding cycle defined from a beginning reset point of said NRZ signal;

encoding means for encoding an encoded signal representing said NRZ signal, said encoded signal having a waveform which switches between two opposing polarities with each polarity change of the data bits in each encoding cycle, wherein the polarity of the encoding signal is switched with widths of M/M, M+1/M, and M+2/M bit periods after a previous polarity switch depending upon whether a polarity change is detected by said polarity change detecting means and the count maintained by said counting means, as follows:

(1) a width of M/M when a current data bit is the same as a previous data bit (no polarity change);

(2) a width of M+1/M when a current data bit has a polarity that is changed from that of a previous data bit, the count of said counting means being thereupon indexed by one;

(3) a width of M+2/M when a current data bit has a polarity that is changed from that of a previous data bit and the count of said counting means including the current polarity change is equal to M-1 and a 101 bit pattern is present in the data stream to the encoding means, the count of said counting means being thereupon reset to define the beginning reset point for the next encoding cycle, wherein, in all of the above said means, M is a positive even integer greater than 3.

2. An encoder apparatus according to claim 1 further comprising filtering means for filtering said encoded signal such that said filtered encoded signal as transmitted has a Nyquist data compression efficiency of approximately 15.3 bits/HZ-bandwidth.

3. An encoder apparatus according to claim 2, wherein M is equal to 8, said counting means is set upon each reset to count 7 polarity changes in the ensuing encoding cycle, and the width of the polarity switch of said encoding signal is set 10/8 bit periods after a previous polarity switch upon the 7th polarity change counted in the encoding cycle.

4. An encoder apparatus according to claim 1, wherein each polarity change of the data bits is detected by a leading edge transition from one polarity to another, and upon said M-1th polarity change between a current data bit and a following data bit, the width of the polarity switch of said encoding signal is set M+2/M bit periods after a previous polarity switch, the following data bit is omitted as the last bit in the current encoding cycle, and the counting means is reset for a next encoding cycle defined by a beginning reset point at a next following data bit.

5. An encoder apparatus according to claim 1, further comprising decoding means for receiving said encoded signal as transmitted and regenerating said NRZ input signal therefrom.

6. An encoder apparatus according to claim 5, wherein said decoding means includes detecting means for detecting said widths of M/M, M+1/M, and M+2/M bit periods between the polarity switches of said encoded signal in a current decoding cycle defined by a current reset point, data signal generating means for clocking data bits out for an output signal at M/M bit periods having polarities depending upon the widths of said encoded signal detected by said detecting means, and reset means responsive to detection of an M+2/M width by said detecting means for defining a next reset point and synchronizing said decoding means for a next decoding cycle.

7. An encoder apparatus according to claim 6, wherein each polarity change of the data bits is detected by a leading edge transition from one polarity to another, and upon said M−1th polarity change between a current data bit and a following data bit, the width of the polarity switch of said encoding signal is set M+2/M bit periods after a previous polarity switch when the data pattern is 101, the following data bit is omitted as the last bit in the current encoding cycle, and the counting means is reset for a next encoding cycle defined by a beginning reset point at a next following data bit, and wherein upon detection of said width of M+2/M bit periods by said decoding means, said data signal generating means inserts two data bits including said omitted data bit with the first inserted bit being a "0" and the second inserted bit being a "1".

8. A method of encoding a binary NRZ data signal representing a series of binary data bits of "1" and "0" polarities clocked at a given clock rate to a data output signal of a different apparent bit period rate, comprising the steps of:

clocking each data bit of said NRZ signal with a bit period of M clock periods, wherein M is a positive even integer greater than 3;

detecting whether a current data bit of said NRZ signal has the same or a changed polarity as a previous data bit;

maintaining a count of the number of polarity changes of the data bits in each encoding cycle defined from a beginning reset point of said NRZ signal;

encoding an encoded output signal representing said NRZ signal, said encoded signal having a waveform which switches between two opposing polarities with each polarity change of the data bits in each encoding cycle, wherein the polarity of the encoding signal is switched with widths of M/M, M+1/M, and M+2/M bit periods after a previous polarity switch depending upon whether a polarity change is detected and the count of the polarity changes as follows:

(1) a width of M/M when a current data bit is the same as a previous data bit (no polarity change);

(2) a width of M+1/M when a current data bit has a polarity that is changed from that of a previous data bit, the bit pattern present in said output signal is 101, the count of polarity changes thereupon being indexed by one;

(3) a width of M+2/M when a current data bit has a polarity that is changed from that of a previous data bit and the count being thereupon reset to define the beginning reset point for the next encoding cycle, and the decoder polarity being set to a "1" to remove any decoding ambiguity.

9. A method of encoding according to claim 8, comprising the further step of filtering said encoded signal such that said filtered encoded signal as transmitted has a Nyquist data compression efficiency of at least 10 bits/Hz-bandwidth.

10. A method of encoding according to claim 9, wherein M is set equal to 8, and said filtered encoded signal as transmitted has a Nyquist data compression efficiency of approximately 15.3 bit/HZ-bandwidth.

11. A high speed data transmission system for transmitting a binary NRZ data signal representing data bits of a given bit period over a communications channel, comprising:

encoding means responsive to said binary NRZ data signal for encoding an output encoded signal incorporating signal polarity switches encoded at a plurality of time periods which are equal to and fractionally larger than the bit period of said NRZ data signal and at a given bit rate;

filtering means for filtering extraneous frequencies from said encoded signal other than a baseband frequency thereof, such that said filtered encoded signal occupies a bandwidth which is about 1/6 of the bandwidth of said binary NRZ signal; and transmitting means for transmitting said filtered encoded signal over the communications channel.

12. A high speed data transmission system according to claim wherein said transmitting means is a modem and the communications channel is a telephone line.

13. A high speed data transmission system according to claim 11, wherein said transmitting means includes a balanced modulator having one input for said encoded signal and another input for receiving a carrier signal, in order to provide at an output thereof a double-sideband suppresses carrier output signal which after filtering by means of a simple sideband filter included in said transmitting means becomes a single-sideband signal.

14. A high speed data transmission system according to claim 13, wherein said communications channel is a radio link.

15. A high speed data transmission system according to claim 11, wherein said transmitting means includes an FM modulator for modulating an FM subcarrier signal with said encoded signal such that the FM subcarrier signal shifts in phase according to the polarity switches of said encoded signal.

16. A high speed data transmission system according to claim 11, wherein said encoding means includes:

polarity change detecting means responsive to said NRZ signal for detecting whether a current data bit of said NRZ signal has the same or a changed polarity as a previous data bit, wherein each data bit of said NRZ signal has a bit period of M clock periods;

counting means for maintaining a count of the number of polarity changes of the data bits in each encoding cycle defined from a beginning reset point of said NRZ signal; and further means for encoding an encoded signal representing said NRZ signal, said encoded signal having a waveform which switches between two opposing polarities with each polarity change of the data bits in each encoding cycle, wherein the polarity of the encoding signal is switched with widths of M/M, M+1/M, and M+2/M bit periods after a previous polarity switch depending upon whether a polarity change is detected by said polarity change detecting means and the count maintained by said counting means, as follows:

(1) a width of M/M when a current data bit is the same as a previous data bit (no polarity change);

(2) a width of M+1/M when a current data bit has a polarity that is changed from that of a previous data bit, the count of said counting means being thereupon indexed by one;

(3) a width of M+2/M when a current data bit has a polarity that is changed from that of a previous data bit and the count of said counting means including the current polarity change is equal to M−1 and the bit pattern present in said data stream to said further means is 101, the count of said counting means being thereupon reset to define the beginning reset point for the next encoding cycle, and the polarity of the output device set to remove ambiguity;

wherein, in all of the above said means, M is a positive even integer greater than 3.

17. A high speed data transmission system according to claim 16, wherein said filtering means filters said encoded signal such that said signal as transmitted has a Nyquist data compression efficiency approximately equal to 15.3 bits/HZ bandwidth.

18. A high speed data transmission system according to claim 16, wherein M is equal to 8, said counting means is set upon each reset to count 7 polarity changes in the ensuing encoding cycle, and the width of the polarity switch of said encoding signal is set 10/8 bit periods after a previous polarity switch upon the 7th polarity change counted in the encoding cycle and the bit pattern is 101.

19. A high speed data transmission system according to claim 16, wherein said filtering means provides a sine wave output signal, and said transmitting means includes integrating means for shifting the peaks of said sine wave output by 90 degrees of phase.

20. A high speed data transmission system according to claim 19, further comprising receiving means for said encoded signal as transmitted, said receiving means including differentiating means for shifting the received signal by 90 degrees of phase, and a zero crossing detector for detecting zero crossings in the received signal.

21. A high speed data transmission system according to claim 20, further comprising decoding means for regenerating said NRZ input signal from the received signal, said decoding means including detecting means for detecting said widths of M/M, M+1/M, and M+2/M bit periods between the polarity switches of said encoded signal in a current decoding cycle defined by a current reset point, data signal generating means for clocking data bits out for an output signal at M/M bit periods having polarities depending upon the widths of said encoded signal detected by said detecting means, and reset means responsive to detection of an M+2/M width by said detecting means for defining a next reset point and synchronizing said decoding means for a next decoding cycle.

22. A high speed data transmission system according to claim 11, wherein said filtering means has an effective bandwidth and is operative such that the effect of noise is reduced by a factor of the given bit rate divided by the filter bandwidth.

* * * * *